(12) United States Patent
Botts

(10) Patent No.: US 9,809,123 B1
(45) Date of Patent: Nov. 7, 2017

(54) CONTROL SCHEMES AND INTELLIGENT BATTERY SELECTION FOR ELECTRIC VEHICLES

(71) Applicant: Premergy, Inc., Macon, GA (US)

(72) Inventor: Richard Edward Botts, Griffin, GA (US)

(73) Assignee: Premergy, Inc., Macon, GA (US)

( * ) Notice: Subject to any disclaimer, the term of this patent is extended or adjusted under 35 U.S.C. 154(b) by 0 days.

(21) Appl. No.: 15/657,393

(22) Filed: Jul. 24, 2017

(51) Int. Cl.
| | |
|---|---|
| H02J 7/00 | (2006.01) |
| H02J 7/06 | (2006.01) |
| H02J 7/24 | (2006.01) |
| B60L 11/18 | (2006.01) |
| B60L 3/00 | (2006.01) |
| H01M 10/44 | (2006.01) |
| H02J 7/02 | (2016.01) |

(52) U.S. Cl.
CPC ......... *B60L 11/1818* (2013.01); *B60L 3/0092* (2013.01); *B60L 11/1838* (2013.01); *H01M 10/44* (2013.01); *H02J 7/027* (2013.01)

(58) Field of Classification Search
USPC .................................................. 320/163, 108
See application file for complete search history.

(56) References Cited

U.S. PATENT DOCUMENTS

| | | | | |
|---|---|---|---|---|
| 7,938,092 B2 * | 5/2011 | Yang | ................... | F02N 11/0866 123/179.28 |
| 8,164,228 B1 * | 4/2012 | Botts | ........................ | H02J 7/14 310/178 |
| 8,581,559 B2 * | 11/2013 | Botts | ........................ | H02J 7/14 310/178 |
| 2005/0249985 A1 * | 11/2005 | Muller | .............. | H01M 8/04544 429/9 |
| 2008/0148993 A1 * | 6/2008 | Mack | ........................ | B60L 9/00 105/35 |
| 2010/0319645 A1 * | 12/2010 | Yang | ........................ | F02P 3/096 123/179.5 |
| 2011/0140518 A1 * | 6/2011 | Hattori | .................. | H02J 7/1423 307/9.1 |
| 2013/0234653 A1 * | 9/2013 | Botts | ..................... | H02J 7/0042 320/107 |

* cited by examiner

*Primary Examiner* — Samuel Berhanu
(74) *Attorney, Agent, or Firm* — Eversheds Sutherland (US) LLP

(57) ABSTRACT

Systems and methods are disclosed for control schemes and intelligent battery selection for electric vehicles. In one embodiment, an example method may include determining a first charge level of a first battery system that is configured to power a homopolar generator, causing the first battery system to be charged by a power input source, and determining that a second charge level of the first battery system is greater than a first threshold value. Example methods may include causing the first battery system to power the homopolar generator, wherein the homopolar generator is configured to output charging current to a second battery system, causing the solid state relay to form a parallel connection between a first battery, a second battery, and the homopolar generator, directing a first charging current from the homopolar generator to the first battery, and directing a second charging current from the homopolar generator to the second battery.

20 Claims, 7 Drawing Sheets

CONTROL SCHEMES AND INTELLIGENT BATTERY SELECTION FOR ELECTRIC VEHICLES

FIELD OF THE DISCLOSURE

The present disclosure relates generally to electric vehicles, and more particularly to control schemes and intelligent battery selection for electric vehicles.

BACKGROUND OF THE DISCLOSURE

Electric vehicles may use batteries to power the vehicle. Specific battery capacity and consumption rates may determine a range of driving distance for the electric vehicle. In addition, once batteries of the electric vehicle are drained, charging the batteries for subsequent use may be time consuming. Further, charging the batteries with high voltages to reduce charging times may damage the batteries. Accordingly, control schemes for battery charging and discharging, as well as intelligent battery selection, may be desired.

Figure 1:
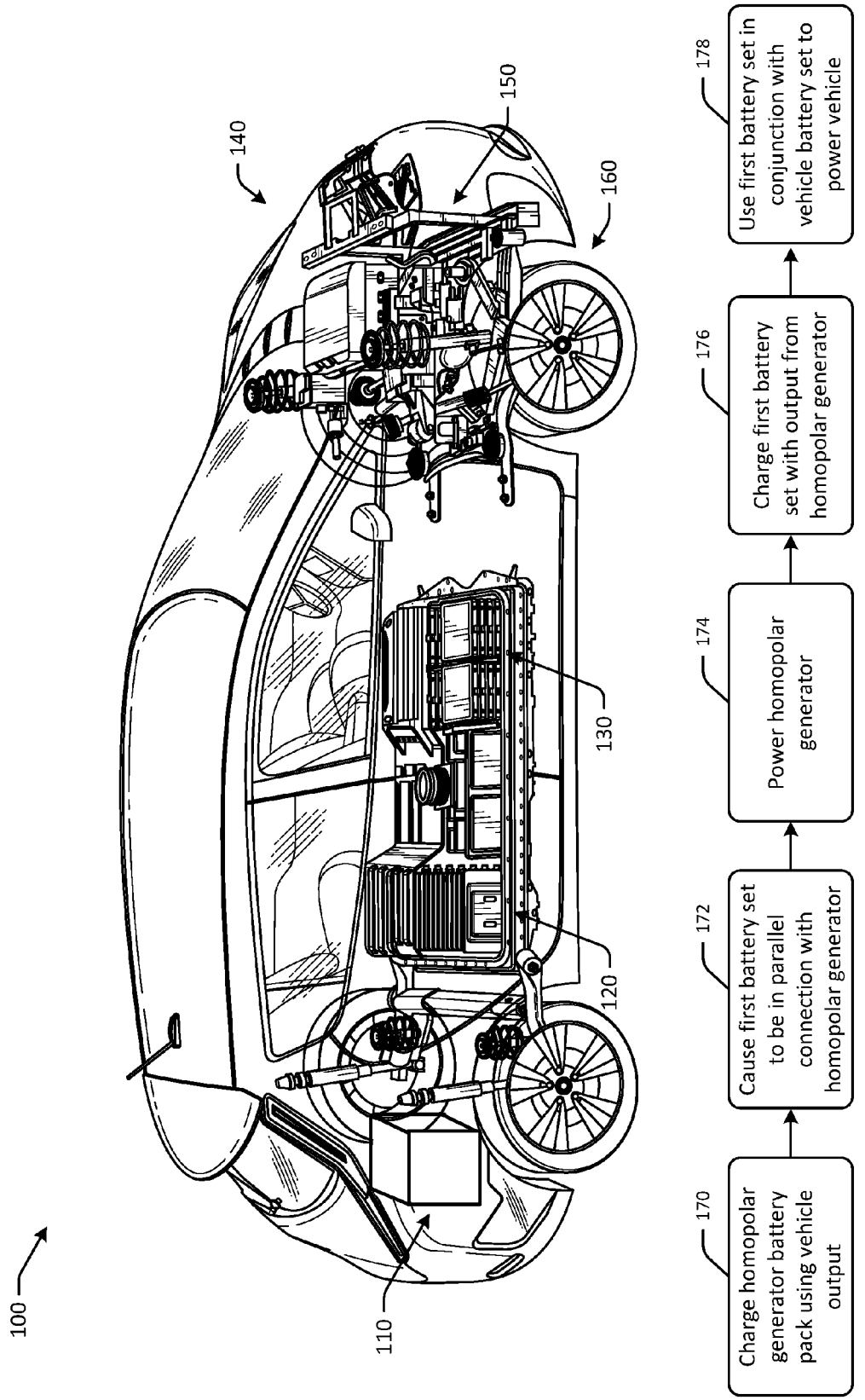
FIG. 1 schematically illustrates an example electric vehicle with a removable homopolar generator with intelligent battery selection and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

Overview

Electric vehicles may use one or more rechargeable batteries to power the electric vehicle. For example, energy stored in batteries may be used to drive one or more motors and impart rotational motion to one or more of the wheels of the vehicle. The batteries may drain over time, and may need to be recharged before subsequent usage. The range of driving distance of the electric vehicle may be based at least in part on the number and capacity of batteries used by the vehicle, as well as the weight profile of the vehicle, size, and so forth. For example, an electric vehicle with a relatively greater battery or energy storage capacity may have a greater range or driving distance without recharging than an electric vehicle with relatively less battery or energy storage. In addition, the time to recharge batteries of the electric vehicle may be time consuming and may reduce the usefulness of the electric vehicle.

Embodiments of the disclosure include control schemes and intelligent battery selection for electric vehicles. Some embodiments may include electric vehicles with removable or fixed homopolar generators that can be used to recharge original or additional batteries of the electric vehicle. Certain embodiments may include additional batteries, thereby increasing the total battery capacity for the electric vehicle. The homopolar generators may be used to charge or recharge one or more batteries of the vehicle while the vehicle is stationary or in motion, and may be able to charge the batteries in a relatively short amount of time, compared to traditional vehicle charging schemes, by managing a voltage output from the homopolar generator and voltage input at the respective batteries. Certain embodiments may increase an amount of power available for use by the electric vehicle by dynamically configuring the batteries in a series connection or a parallel connection. Certain embodiments may also reduce charging times by charging the batteries in a parallel connection.

Some embodiments may manage charging and/or discharging of selected batteries multiple times during operation of an electric vehicle. For example, based at least in part on an electrical load placed on the electric vehicle (e.g., a rate of acceleration, speed, auxiliary power consumption, etc.), embodiments of the disclosure may select specific batteries or sets of batteries to charge or discharge, as well as manage electrical connections (e.g., series connections or parallel connections, etc.) between the batteries. Some embodiments may select which specific batteries power the electric vehicle at a specific time during operation.

This disclosure relates to, among other things, systems, methods, computer-readable media, techniques, and methodologies for control schemes and intelligent battery selection for electric vehicles, which may include multiple rechargeable batteries. In an example embodiment, an electric vehicle may include at least one drive motor configured to impart motion to one or more wheels of the electric vehicle. The electric vehicle may include a number of rechargeable batteries configured to power the at least one drive motor, and a homopolar generator positioned within the electric vehicle and electrically coupled to the rechargeable batteries. The homopolar generator may be configured to generate current to charge the plurality of rechargeable batteries. The electric vehicle may include one or more solid state relays electrically coupled between the rechargeable batteries, and a controller configured to manage charging of the rechargeable batteries.

As a result, embodiments of the disclosure may improve the driving distance or range of the electric vehicle by increasing battery capacity, manage charging/discharging sequences, frequencies, and duration during operation of the vehicle, decrease charging times via the homopolar generator and one or more solid state relays that can dynamically switch from parallel to series connections and back, and improve power output via one or more solid state relays.

Referring now to FIG. 1, an example electric vehicle 100 with a removable homopolar generator 110 with intelligent battery selection and an example process flow is depicted in accordance with one or more embodiments of the disclosure. The electric vehicle 100 may be any suitable electric or hybrid vehicle that is at least partially power by stored energy from, for example, one or more batteries.

The electric vehicle 100 may include a first set of batteries 120 and a second set of batteries 130. The first set of batteries 120 may be aftermarket batteries or may be associated with the homopolar generator 110. For example, the first set of batteries 120 may receive power or current output from the homopolar generator 110. The second set of batteries 130 may be original equipment or batteries that are originally provided with the electric vehicle 100. In some embodiments, the first set of batteries 120 may be positioned in a housing of the homopolar generator 110, or may be positioned elsewhere within the electric vehicle 100. Either or both the first set of batteries 120 or the second set of batteries 130 may be removable from the electric vehicle 100. The first set of batteries 120 or the second set of batteries 130 may be rechargeable batteries. For example, either or both the first set of batteries 120 or the second set of batteries 130 may be recharged by a charging system of the electric vehicle 100 or the homopolar generator 110.

The first set of batteries 120 and the second set of batteries 130 may be used to power the electric vehicle 100. For example, the electric vehicle 100 may include at least one drive motor 150 that is configured to impart motion to one or more wheels 160 of the electric vehicle 100. The drive motor 150 may be positioned in an engine area 140 or elsewhere within the electric vehicle 100.

The homopolar generator 110 may be a generator that is configured to output current and/or a specific voltage that charges one or more batteries of the first set of batteries 120 or the second set of batteries 130. The homopolar generator 110 may be positioned within the electric vehicle 100 and may be electrically coupled to the first set of rechargeable batteries 120 in the example of FIG. 1. The homopolar generator 110 may be configured to generate current to charge the first set of rechargeable batteries 120.

The homopolar generator 110 may be positioned in a trunk space 200 of the electric vehicle 100 and may be detachable or otherwise removable from the electric vehicle 100. The homopolar generator 110 may include one or more components in a housing. For example, the homopolar generator 110 may include a number of frame elements that may support one or more magnets aligned along a shaft of the homopolar generator 110. The frame elements may be plastic frame elements positioned to support magnets and/or conductive element portions of the homopolar generator 110. The frame elements may be rectangular or may have another geometry. A drive motor may be used to cause the shaft of the homopolar generator 110 to rotate. One or more conductive discs may be mounted to the shaft and may rotate with the shaft. The conductive discs may generate a current in conjunction with the magnets positioned in a recessed portion of the respective frame elements. A copper component, or a semi-copper component or other conductive material (e.g., copper and carbon blend, etc.), may be used to transport current generated by the homopolar generator 110 to a power output component. The copper component may extend along some of the exterior surfaces of the homopolar generator 110. A certain amount or volume of copper may be needed to transport the amount of current generated by the homopolar generator 110. Conductive plates may be in communication with the copper components and may be used for the transport of current.

In some embodiments, the homopolar generator 110 may include a drive motor, a shaft, and one or more copper discs mounted on the shaft. The drive motor may be configured to impart motion to the shaft to rotate the copper discs. The drive motor may be powered by one or more batteries, such as a battery pack that is charged by an alternator or other component of the vehicle. The shaft may be powered or rotated by an axle or drive motor/shaft of the electric vehicle in some embodiments. The homopolar generator 110 may include a set of magnets that may be mounted in a fixed position about either side of the copper disc. The homopolar generator 110 may be positioned in a housing and may be removable from an electric vehicle and may be portable.

The homopolar generator 110 may include a number of frame elements. The frame elements may form a housing of the homopolar generator 110. The shaft may extend through the frame elements. For example, the shaft may extend through a center of one or more of the frame elements.

The copper discs may be positioned adjacent to one or more copper plates that may be mounted on one or more sides of the frame elements. For example, a first copper plate may be mounted to a first side of a first frame element. A second copper plate may be mounted to a second side of the first frame element. A copper linkage component may be in contact with the first copper plate and the second copper plate, and may be disposed about a third side of the first frame element that is transverse to the first side and the second side. The copper discs and/or copper plates may be formed of a copper material, carbon material, a combination thereof, or another material.

The magnets may be positioned in the frame elements (e.g., in a recessed portion of the frame elements, etc.) and may be positioned about or adjacent to the copper discs. The magnets may be in a fixed position with respect to the shaft, or the copper discs may be in a fixed position.

The homopolar generator 110 may include a first set of conductive brushes mounted to the first copper plate. The first set of conductive brushes may be in electrical communication with a first copper disc of the copper discs. A second set of conductive brushes may be mounted to the second copper plate. The second set of conductive brushes may be in electrical communication with a second copper disc of the copper discs.

The first set of rechargeable batteries 120 and the second set of batteries 130 may be used to power the electric vehicle 100. For example, in the process flow of FIG. 1, at a first operation 170 a homopolar generator battery pack may be charged using the output of the electric vehicle 100. The homopolar generator battery pack may be a part of the homopolar generator 110, and may be used to power a drive motor or other component of the homopolar generator 110. The homopolar generator battery pack may be charged by one or more components of the electric vehicle 100, such as the alternator, a regenerative braking system, or another component.

At a second operation 172, the first set of batteries 120 may be caused to be in a parallel connection with the homopolar generator 110. For example, if the first set of batteries 120 includes a first battery and a second battery, the first battery and the second battery would both be caused to be in a parallel connection with respect to the homopolar generator 110, as opposed to a series connection. The parallel connection may be generated by an actuation device, a solid state relay, one or more MOSFETs, or other electrical or mechanical (or electromechanical) components.

At a third operation 174, the homopolar generator 110 may be powered. For example, operation of the homopolar generator 110 may be initiated by causing the homopolar generator battery pack to power a generator component or drive motor of the homopolar generator 110. The drive motor may cause one or more conductive discs to rotate about a shaft in the presence of an electromagnetic field, causing a current to be generated.

At a fourth operation 176, the first set of batteries 120 may be charged with output from the homopolar generator 100. The current output from the homopolar generator 110 may be used to charge the batteries in the first set of batteries 120. Because the batteries in the first set of batteries 120 are in a parallel connection with respect to the homopolar generator 110, the respective batteries in the first set of batteries 120 may charge simultaneously, thereby reducing an overall charge time. In addition, the voltage output of the homopolar generator 110 may substantially match, or may be slightly higher than, the voltage levels of the respective batteries, so as to bring the voltage level of the respective batteries up to a fully charged level. Because a difference in voltage between the output of the homopolar generator 110 and the charge level of the batteries may be regulated, charging time of the batteries may be reduced due to an increase in acceptance of the current by the batteries 120 from the homopolar generator 110.

At a fifth operation 178, the first set of batteries 120 may be used in conjunction with the vehicle battery set, or the second set of batteries 130, to power the vehicle. The first set of batteries 120 and the second set of batteries 130 may be dynamically arranged in a series or parallel configuration during discharging, so as to provide additional power to the electric vehicle 100 if needed, or to provide additional driving distance to the electric vehicle 100 if needed.

Figure 2:
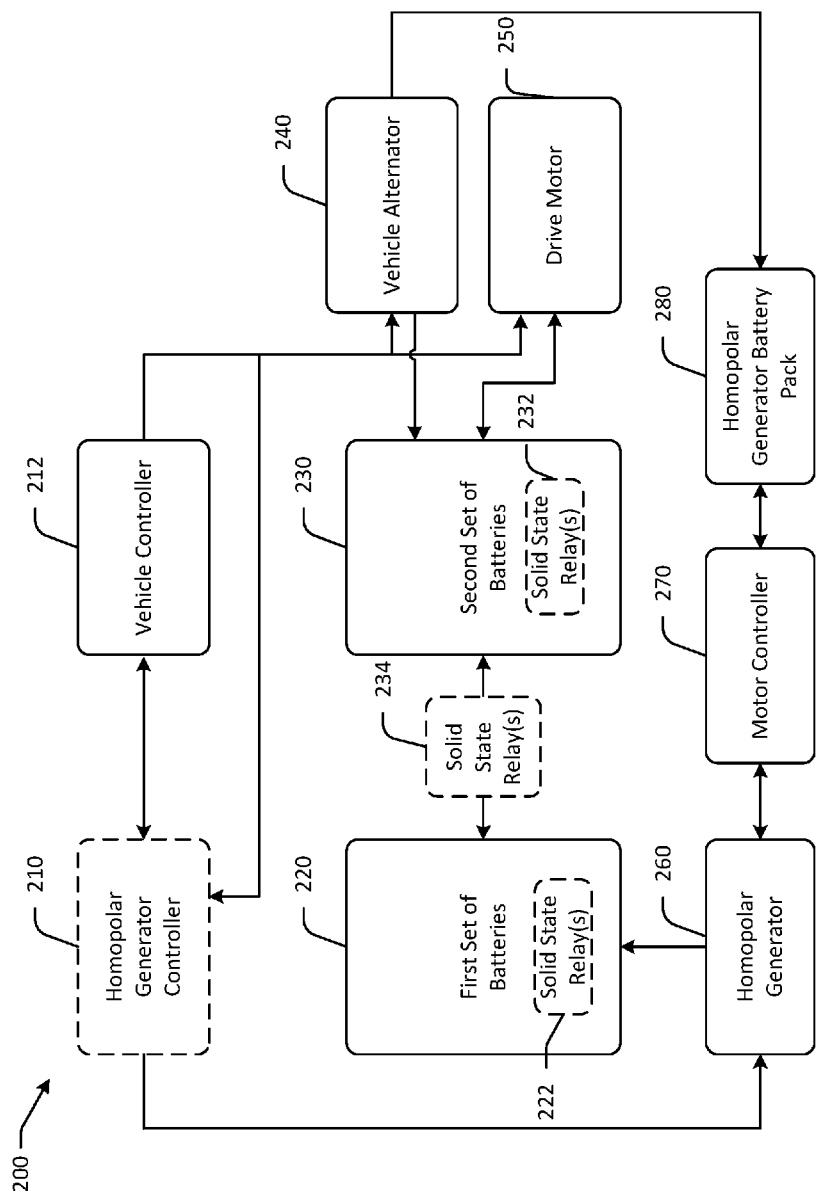
FIG. 2 schematically illustrates an electric vehicle control system and related hardware components in accordance with one or more embodiments of the disclosure.

FIG. 2 schematically illustrates an electric vehicle control system 200 and related hardware components in accordance with one or more embodiments of the disclosure. The electric vehicle control system 200 may include an optional homopolar generator controller 210 and a vehicle controller 212. In some embodiments, a single controller may be used. The homopolar generator controller 210 may be configured to manage operation of a homopolar generator 260, as well as to manage charging of one or more batteries connected to the homopolar generator 260. The vehicle controller 212 may be a default vehicle controller configured to manage one or more aspects of the electric vehicle, such as charging or discharging of the original battery set.

The electric vehicle control system 200 may include a first set of batteries 220 and a second set of batteries 230. The first set of batteries 220 and a second set of batteries 230 may be rechargeable batteries. The first set of batteries 220 and the second set of batteries 230 may be original batteries in that the batteries are part of the original manufacturer equipment, or may be aftermarket batteries. In some embodiments, the first set of batteries 220 may be aftermarket batteries or may be a part of the homopolar generator 260 or related system, and the second set of batteries 230 may be original equipment. In some embodiments, the rechargeable batteries may be lithium-ion (Li-ion) batteries. In other embodiments, the rechargeable batteries may be lithium-ion polymer (Li-ion polymer) batteries, nickel metal hydride (NiMH) batteries, nickel cadmium (NiCd) batteries, or the like. The rechargeable batteries may have an identical configuration, with the same nominal voltage and the same capacity. In some embodiments, the rechargeable batteries each may have a nominal voltage of 3.7V. In other embodiments, the batteries each may have a nominal voltage of 1.8V. Still other nominal voltages of the batteries may be used. Although the illustrated embodiment is shown as including two rechargeable batteries, the homopolar generator controller 210 may include any number of rechargeable batteries electrically connected to one another and configured to power the processor(s). In various embodiments, the homopolar generator controller 210 may include three, four, five, six, seven, eight, nine, ten, or more rechargeable batteries each having an identical configuration, with the same nominal voltage and the same capacity.

A first set of solid state relays 222 may be configured to dynamically adjust electrical connections between individual or groups of batteries in the first set of batteries 220 from parallel connections to series connections, or from series connections to parallel connections. As a result, any individual battery or group of batteries within the first set of batteries 220 may be charged or discharged, and charging time can be reduced by using parallel connections. Likewise, a second set of solid state relays 232 may be configured to dynamically adjust electrical connections between individual or groups of batteries in the second set of batteries 230 from parallel connections to series connections, or from series connections to parallel connections.

One or more solid state relay 234 may be electrically coupled between the plurality of rechargeable batteries, or the first set of batteries 220 and the second set of batteries 230. Specifically, a third set of solid state relays 234 may be configured to dynamically adjust electrical connections between the first set of batteries 220 and the second set of batteries 230 from parallel connections to series connections, or from series connections to parallel connections. As a result, each bank of batteries can be discharged or charged in parallel or series with respect to the other.

In particular, the one or more solid state relay(s) may be configured to transition between a first state in which the one or more solid state relay(s) form a series connection between the batteries in either or both the first set of batteries 220 and the second set of batteries 230, and a second state in which the one or more solid state relay(s) form a parallel connection between the batteries in either or both the first set of batteries 220 and the second set of batteries 230. In this manner, the one or more solid state relay(s) may facilitate power management of the rechargeable batteries during discharging and charging of the rechargeable batteries. In some embodiments, the one or more solid state relay(s) may include one or more metal-oxide-semiconductor field-effect transistor(s) (MOSFET(s)). In some embodiments, the one or more solid state relay(s) may include one or more enhancement-mode MOSFETs. Other types of solid state relay(s) may be used. The homopolar generator controller 210 may include any number of solid state relay(s) configured to selectively form a series connection between the rechargeable batteries and a parallel connection between the rechargeable batteries.

The electric vehicle control system 200 may include a vehicle alternator 240, a drive motor 250, and in some embodiments, other components such as a starter. The drive motor 250 may be controlled by the vehicle controller 212 and may be used to at least partially charge the second set of batteries 230. The first set of batteries 220 and/or the second set of batteries 230 may be configured to provide power to one or more components of the electric vehicle, such as a starter.

The vehicle alternator 240 may generate a current when the electric vehicle is in motion or is otherwise operational. The vehicle controller 212 may control operation of the vehicle alternator 240. The vehicle alternator 240 may output current to a homopolar generator battery pack 280. The homopolar generator battery pack 280 may store energy that is used to power the homopolar generator 260 during operation. The homopolar generator battery pack 280 may provide a steady and available source of power for the homopolar generator 260. The homopolar generator battery pack 280 may be in communication with a motor controller 270 and/or the homopolar generator 260, which can optionally be used to manage operation of the drive motor of the homopolar generator 260.

The homopolar generator controller 210 may be in communication with the vehicle controller 212 and may determine information such as vehicle load or usage, which in turn can be used to manage series or parallel connections of the first set of batteries 220 and the second set of batteries 230, as well as determining when to charge certain batteries and charging times. In some embodiments, the controller 210 may receive real-time vehicle information from an onboard vehicle computer. For example, under high load, the homopolar generator controller 210 may cause the first set of batteries 220 and the second set of batteries 230 to be in a series connection, thereby increasing available power. Under light load, the homopolar generator controller 210 may cause the first set of batteries 220 and the second set of batteries 230 to be in a parallel connection, thereby increasing driving range. The homopolar generator controller 210 may manage operation of one or more of the respective solid state relays to generate the respective series or parallel connections.

The homopolar generator controller 210 may be configured to cause the one or more solid state relays 234 to create a series connection between the first set of batteries 220 and the second set of batteries 230 during discharging, and to create a parallel connection between the first set of batteries 220 and the second set of batteries 230 during charging.

The homopolar generator controller 210 may be configured to match an output voltage of the homopolar generator 260 to a voltage level of at least one of the rechargeable batteries in the first set of batteries 220.

The homopolar generator 260 may include a power output component that may be coupled to the solid state relay 222 or directly to one or more batteries of the first set of batteries 220 in the example of FIG. 2. A voltage output of the homopolar generator 260 may substantially match a voltage level of a device connected to the power output component, such as the batteries being charged.

The homopolar generator controller 210 may be connected to the factory CAN system or the vehicle controller 220 to monitor parameters of the electric vehicle. The vehicle information may be used to make determinations by the homopolar generator controller 210. The homopolar generator controller 210 monitors the homopolar generator 260 input and output, motor load, and the state of charge on the first set of batteries 220 (e.g., 48 volts, etc.). The second set of batteries 230 may be maintained by the alternator 240 mated to the vehicle drive train. The main battery bank, or the second set of batteries 230 and its batteries state of charge are also monitored.

The first set of batteries 220 may include, in one example, 48 batteries grouped in twelve sets of four batteries. Each set may have a switch plate that can switch the batteries from 32 volts down to 4 volts. The cells may be charged at four volts. The switch plate then returns to its center position via an actuator. In the center position it may be in 32 volt mode. When in this position it may be paralleled to a 32 volt potential on the second set of batteries 230. This may be done every 32 volts across the entire series of batteries in the second set of batteries 230. This results in 12 sets of 4 batteries.

The result may be a system that can selectively charge the first set of batteries 220. Once paralleled to the second set of batteries 230 the difference in state of charge causes the current to flow from the charged battery to the depleted battery raising its voltage from 3.2 volts back to nominal voltage of 3.8 in one example. This can be done in sets, individually or all at once. The result may be the second set of batteries 230 may be charged to 90% charge in under 10 minutes. Collectively the discharge may be between 1200 to 1500 amps at 32 volts. Each pack would experience 130 amps or so decreasing over the ten minutes to around 30 amps. Discharges can be selectively electric vehicle out depending on the number of battery packs placed in series 1 through 12.

In FIG. 2, the homopolar generator 260 is supported by two sets of six batteries in the homopolar generator battery pack 280 that are not connected to the first set of batteries 220, creating an ability to switch between the 48 volt potentials. In some embodiments, the drive motor 250 can be directly connected to the alternator 240 bypassing the rectifier. This may be called overriding and may be a 5 Kw permanent magnet Alternator/BLDC motor.

The homopolar generator 260 generator may be configured to produce 1400 amps, thereby providing adequate amperage at 3.2 through 4 volts. Accordingly, 116 amps may be available for three sets of batteries. Recovery time may be dependent on state of charge. Once the needed state of charge may be reached the homopolar generator controller 210 may turn off or disengage the actuator allowing it to re-center to the series and connected to the second set of batteries 230 at a 36 volt parallel, or it can connect the other parallel on the pack. The batteries individually may be in a series parallel arrangement.

A switch plate may be used to connect to each parallel of the batteries individually at 4 volts without breaking the series of 8 volts in series. Batteries may be charged by charging halves of multiple packs for faster charging. The controller could choose to add packs as the amperage reduces over time. This would have the effect of regulating generator speed and amperage. Combining these capabilities allows for many charging and discharging algorithms.

In another embodiment, the amp hour on the second set of batteries 230 may be adjusted in or near real time. A fast charge time on the first set of batteries 220 can be used to dump a lot of energy in a short time, which increases efficiency when off the throttle in a deceleration mode and during braking.

When the electric vehicle is not in operation, the vehicle controller 212 may top off and balance the battery cells. Also, the wall power can step down and rectify voltage. This can be used to operate the homopolar generator controller

210, as well as provide power for the operation of the generator to recover the bank and bulk charge the second set of batteries 230.

In some embodiments, the homopolar generator 260 may operate as a drive motor if allowed to slow down below the batteries state of charge. If the RPMs are held at the state of charge, it neither charges nor drives. The direction of rotation may remain constant with either function. This could be used to assist in motion or in a standalone system to operate a water pump for example. Another note may be that the charge speed and drive speed may be within 1000 RPMs. Designs could include designing the homopolar generator 260 or motor on a common shaft, thereby providing the conventional drive and the other provides regeneration capability.

In an illustrative configuration, the homopolar generator controller 210 may include one or more processors (processor(s)), one or more memory devices (also referred to herein as memory), one or more input/output (I/O) interface(s), one or more network interface(s), one or more antenna(e), one or more transceiver(s), and/or data storage. The homopolar generator controller 210 may further include one or more bus(es) that functionally couple various components of the homopolar generator controller 210. These various components will be described in more detail hereinafter.

The bus(es) may include at least one of a system bus, a memory bus, an address bus, or a message bus, and may permit the exchange of information (e.g., data (including computer-executable code), signaling, etc.) between various components of the homopolar generator controller 210. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory of the homopolar generator controller 210 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage may include removable storage and/or non-removable storage including, but not limited to, magnetic storage, optical disk storage, and/or tape storage. The data storage may provide non-volatile storage of computer-executable instructions and other data. The memory and the data storage, removable and/or non-removable, are examples of computer-readable storage media (CRSM) as that term is used herein.

The data storage may store computer-executable code, instructions, or the like that may be loadable into the memory and executable by the processor(s) to cause the processor(s) to perform or initiate various operations described herein. The data storage may additionally store data that may be copied to the memory for use by the processor(s) during the execution of the computer-executable instructions. Moreover, output data generated as a result of execution of the computer-executable instructions by the processor(s) may be stored initially in the memory, and may ultimately be copied to data storage for non-volatile storage.

More specifically, the data storage may store one or more operating systems (O/S); one or more database management systems (DBMS); and one or more program module(s), applications, engines, computer-executable code, scripts, or the like such as, for example, one or more communication module(s) and/or one or more power management module(s). Some or all of these module(s) may be or include sub-module(s). Any of the components depicted as being stored in data storage may include any combination of software, firmware, and/or hardware. The software and/or firmware may include computer-executable code, instructions, or the like that may be loaded into the memory for execution by one or more of the processor(s). Any of the components depicted as being stored in data storage may support the functionality described in reference to the corresponding components named in this disclosure.

The data storage may further store various types of data utilized by the components of the homopolar generator controller 210. Any data stored in the data storage may be loaded into the memory for use by the processor(s) in executing computer-executable code. In addition, any data depicted as being stored in the data storage may potentially be stored in one or more datastore(s) and may be accessed via the DBMS and loaded in the memory for use by the processor(s) in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) may be configured to access the memory and execute computer-executable instructions loaded therein. For example, the processor(s) may be configured to execute computer-executable instructions of the various program module(s), applications, engines, or the like of the homopolar generator controller 210 to cause or facilitate various operations to be performed in accordance with one or more embodiments of the disclosure. The processor(s) may include any suitable processing unit capable of accepting data as input, processing the input data in accordance with stored computer-executable instructions, and generating output data. The processor(s) may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) may be capable of supporting any of a variety of instruction sets.

The homopolar generator controller 210 may include computer-executable instructions, code, or the like that responsive to execution by one or more of the processor(s) may perform functions including, but not limited to, determining a voltage of a rechargeable battery of the homopolar generator controller 210, causing one or more solid state relays of the homopolar generator controller 210 to form a series connection or a parallel connection between a first rechargeable battery and a second rechargeable battery, causing a first rechargeable battery and a second rechargeable battery of the homopolar generator controller 210 to power the electric vehicle, determining that the homopolar generator controller 210 is connected to an external power source, causing a first rechargeable battery and a second rechargeable battery of the homopolar generator controller 210 to be charged by an external power source, and the like.

In addition, various program module(s), script(s), plug-in(s), Application Programming Interface(s) (API(s)), or any other suitable computer-executable code hosted locally on the homopolar generator controller 210, and/or hosted on other computing device(s) accessible via one or more networks, may be provided to support the functionality provided by the program module(s), applications, or computer-executable code depicted in FIG. 2 and/or additional or alternate functionality. Further, functionality may be modularized differently such that processing described as being supported collectively by the collection of program module(s) depicted in FIG. 2 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 2 may be implemented, at least partially, in hardware and/or firmware.

It should further be appreciated that the homopolar generator controller 210 may include alternate and/or additional hardware, software, or firmware components beyond those described or depicted without departing from the scope of the disclosure. More particularly, it should be appreciated that software, firmware, or hardware components depicted as forming part of the homopolar generator controller 210 are merely illustrative and that some components may not be present or additional components may be provided in various embodiments. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 3:
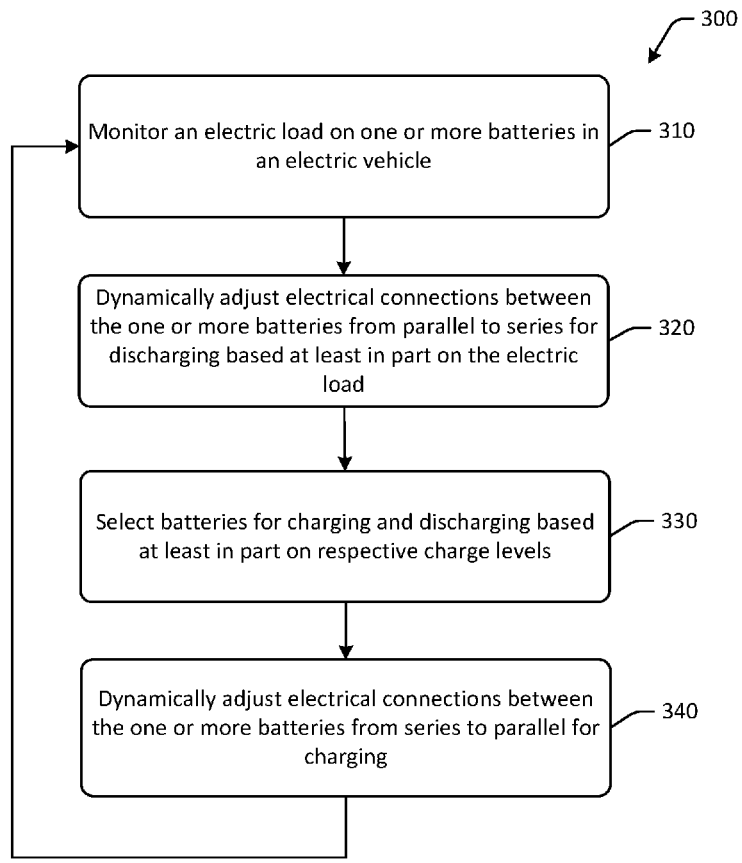
FIG. 3 is an example process flow diagram for control schemes and intelligent battery selection for electric vehicles having multiple rechargeable batteries in accordance with one or more embodiments of the disclosure.

FIG. 3 is an example process flow 300 for control schemes and intelligent battery selection for electric vehicles having multiple rechargeable batteries in accordance with one or more embodiments of the disclosure. Although certain operations are illustrated as occurring separately in FIG. 3, some or all of the operations may occur concurrently or partially concurrently. In some embodiments, the operations of the process flow 300 may be executed by one or more processor(s), such as processor(s) of the homopolar generator controller 210.

At block 310 of the process flow 300, an electric load on one or more batteries in an electric vehicle may be monitored. For example, computer-executable instructions of a homopolar generator controller or other processor, such as a vehicle controller or computer module, may be executed to monitor an electric load on batteries or battery systems of the electric vehicle. Electric load may be monitored using one or more sensors and may be monitored periodically and/or in real-time or near real-time. The electric load may be an amount of power output or current flowing from the batteries and/or an amount of electric current or power requested and/or required to operate the electric vehicle under current operating conditions. For example, using an air conditioner system of the electric vehicle may increase the electric load on the vehicle, as may heavy acceleration. In contrast, relatively slow acceleration or driving on a downhill surface may reduce an electric load on the electric vehicle and/or the batteries.

At block 320, electrical connections between the one or more batteries may be dynamically adjusted from parallel connections to series connections for discharging based at least in part on the electric load. For example, computer-executable instructions of a homopolar generator controller or other processor may be executed to dynamically adjust one or more electrical connections between the one or more batteries from a parallel connection to a series connection during discharging based at least in part on the electric load. For example, the electric vehicle may be under heavy acceleration and may therefore have an increased electric load. To accommodate the electric load, the homopolar generator controller may cause the batteries to be connected in a series connection, thereby increasing the available discharging capacity of the batteries. The connection may be changed from parallel to series, or from series to parallel, by one or more solid state relays or other electrical or mechanical component. Electrical connections between the batteries may be changed from parallel to series or series to parallel multiple times during operation of the vehicle, and may be changed, in some embodiments, during each charging or discharging event that occurs. For example, the batteries may be switched to series during a heavy acceleration discharging event, and then to parallel during a subsequent braking event during which the batteries may be charged.

At block 330, batteries for charging or discharging may be selected based at least in part on respective charge levels. For example, computer-executable instructions of a homopolar generator controller or other processor may be executed to determine respective charge levels of one or more batteries. Charge levels may be determined using a sensor or hardware component, or may be requested from, for example, a vehicle controller. Based at least in part on the respective charge levels, specific batteries, or specific banks/sets of batteries, may be selected for charging or discharging. For example, batteries having charge levels below a first threshold may be selected for charging, while batteries having charge levels above the first threshold or another threshold may be selected for discharging. Battery charge levels may therefore be maintained within certain ranges or may have near uniform charge levels.

At block 340, electrical connections between the one or more batteries may be dynamically adjusted from series connections to parallel connections for charging. For example, computer-executable instructions of a homopolar generator controller or other processor may be executed to dynamically adjust one or more electrical connections between the one or more batteries from a series connection to a parallel connection during charging, so as to reduce charging time for the batteries by charging the batteries in parallel. In some embodiments, charging times for sets of batteries or for a vehicle may be reduced to about 10 minutes, or less than five minutes. The process flow 300 may then return to block 310 in an iterative process that may be performed during operation of the electric vehicle.

In another example embodiment, a load on the electric vehicle may be determined to be less than a certain threshold (e.g., less than 50% maximum load, etc.). The electric vehicle may, for example, be on cruise control on relatively flat ground. In such instances, a parallel connection may be caused to be created between the battery systems powering the electric vehicle (e.g., the second battery system and a third battery system in the example of FIG. 3, etc.), so as to cause near uniform discharge of all of the batteries powering the electric vehicle. If additional power is needed, the batteries can be switched into a series configuration.

In another example embodiment, a third battery system may be included to power the electric vehicle. A charge level of the third battery system may be monitored. If the charge level is determined to be less than the second threshold, the homopolar generator controller may cause the third battery system to be supplemented with power from the second battery system, or vice versa, depending on whether the third battery system or the second battery system is the primary battery system powering the electric vehicle.

Figure 4:
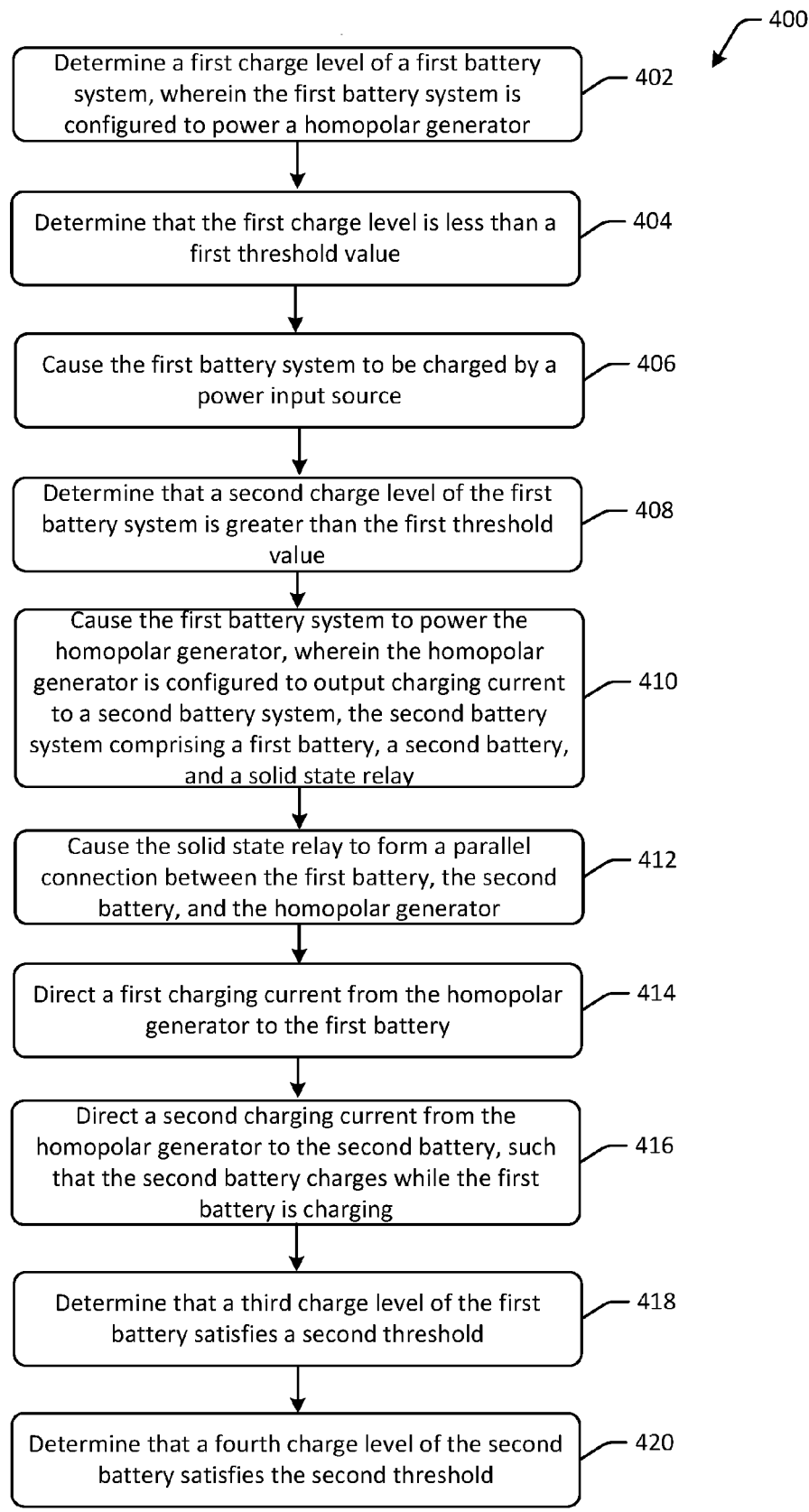
FIG. 4 is an example process flow diagram for control schemes and intelligent battery selection for electric vehicles having multiple rechargeable batteries in accordance with one or more embodiments of the disclosure.

FIG. 4 is an example process flow 400 for control schemes and intelligent battery selection for electric vehicles having multiple rechargeable batteries in accordance with one or more embodiments of the disclosure. Although certain operations are illustrated as occurring separately in FIG. 4, some or all of the operations may occur concurrently or partially concurrently. In some embodiments, the operations of the process flow 400 may be executed by one or more processor(s), such as processor(s) of the homopolar generator controller 210.

At optional block 402 of the process flow 400, a first charge level of a first battery system may be determined, wherein the first battery system is configured to power a homopolar generator. The first battery system may be a battery system that powers a homopolar generator. In other embodiments, an alternator of the vehicle or a mechanical component, such as a drive shaft or axle, may power the homopolar generator instead of the first battery system. In one example, computer-executable instructions of a homopolar generator controller or other processor, such as a vehicle controller or computer module, may be executed to determine a first charge level of the first battery system. The first charge level may be determined using one or more sensors or may be requested from another computer component of the electric vehicle.

At block 404 of the process flow 400, it may be determined that the first charge level is less than a first threshold value. For example, computer-executable instructions of a homopolar generator controller or other processor may be executed to determine that the first charge level is less than or equal to a first threshold value. The first charge level may be compared to a first threshold value, which may be, in one example, 9 volts or 25% charge, or another metric.

At block 406 of the process flow 400, the first battery system may be caused to be charged by a power input source. For example, computer-executable instructions of a homopolar generator controller or other processor may be executed to cause the first battery system to be charged by a power input source. The power input source may be an alternator, a wall outlet power source, or other power source that is connected to or otherwise a part of the electric vehicle. In some embodiments, the power input source may be one or more solar panels, wind turbines, or other renewable energy source. Such embodiments may include homopolar generator systems that can be removed from the electric vehicle and used in other applications.

At block 408 of the process flow 400, it may be determined that a second charge level of the first battery system is greater than the first threshold value. For example, computer-executable instructions of a homopolar generator controller or other processor may be executed to determine that a second charge level is greater than the first threshold value. The second threshold value may be determined after the first battery system has charged for a period of time. For example, the second charge level may be greater than a threshold value of 5 volts, or 50%, or another metric.

At block 410 of the process flow 400, the first battery system may be caused to power the homopolar generator, wherein the homopolar generator is configured to output charging current to a second battery system, the second battery system comprising a first battery, a second battery, and a solid state relay. For example, computer-executable instructions of a homopolar generator controller or other processor may be executed to cause the homopolar generator to be initiated or powered on. As the homopolar generator is operated, the homopolar generator may generate a current that is output to the second battery system. The output from the homopolar generator may be directed through one or more optional solid state relays to the first battery and the second battery. The solid state relay(s) may provide a switchable series/parallel connection between the first battery and the second battery of the second battery system.

At block 412 of the process flow 400, the solid state relay may be caused to form a parallel connection between the first battery, the second battery, and the homopolar generator, such that the homopolar generator is configured to charge the first battery and the second battery in parallel. For example, computer-executable instructions of a homopolar generator controller or other processor may be executed to cause the solid state relay to form a parallel connection between the first battery, the second battery, and the homopolar generator. In one example, the solid state relay(s) may be adjusted to create a parallel connection between the first battery and the second battery.

At block 414 of the process flow 400, a first charging current may be directed from the homopolar generator to the first battery. For example, computer-executable instructions of a homopolar generator controller or other processor may be executed to direct or route the first charging current, which may be a portion of the output of the homopolar generator, to the first battery.

At block 416 of the process flow 400, a second charging current may be directed from the homopolar generator to the second battery, such that the second battery charges while the first battery is charging. For example, computer-executable instructions of a homopolar generator controller or other processor may be executed to direct or route the second charging current, which may be a portion or a remainder of the output of the homopolar generator, to the second battery at the same time the first charging current is charging the first battery. The second charging current may be equal to the first charging current.

At block 418 of the process flow 400, it may be determined that a third charge level of the first battery satisfies a second threshold value. For example, computer-executable instructions of a homopolar generator controller or other processor may be executed to determine a third charge level of the first battery after the first battery has been charged for a period of time. The third charge level may be compared to a second threshold value, which may be, in one example, 12 volts or 75% charge, or another metric. In some embodiments, charge levels of groups of batteries may be used instead of individual levels.

At block 420 of the process flow 400, it may be determined that a fourth charge level of the second battery satisfies the second threshold value. For example, computer-executable instructions of a homopolar generator controller or other processor may be executed to determine a fourth charge level of the second battery after the second battery has been charged for a period of time. The fourth charge level may be compared to the second threshold value, which may be, in one example, 12 volts or 75% charge, or another metric. In some embodiments, charge levels of groups of batteries may be used instead of individual levels. Both the first battery and the second battery of the second battery system may be sufficiently charged, and the homopolar generator may be optionally disengaged or powered off. The process flow 400 may occur in portions over a driving cycle or during usage of an electric vehicle, and may occur more than once during operation of an electric vehicle.

Figure 5:
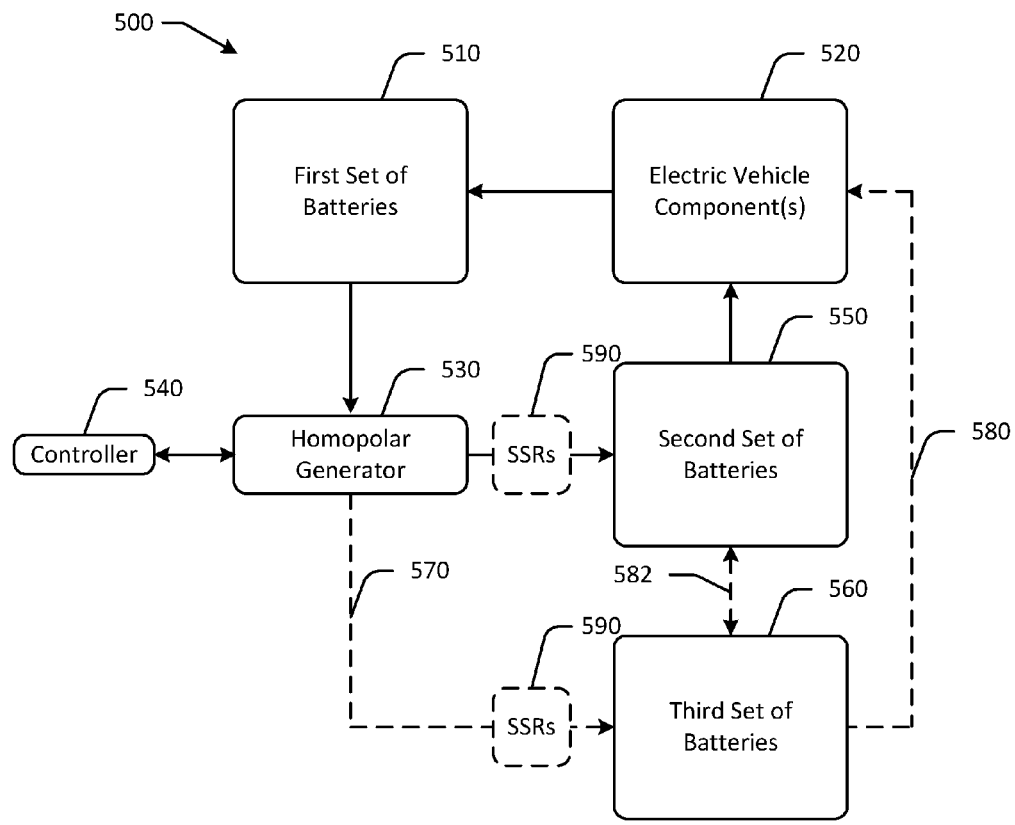
FIG. 5 schematically depicts a charging system for electric vehicle batteries in accordance with one or more embodiments of the disclosure.

FIG. 5 schematically depicts a charging system 500 for electric vehicle batteries in accordance with one or more embodiments of the disclosure. The charging system 500 may include a first set of batteries 510, one or more electric vehicle components 520, a homopolar generator 530, a controller 540, a second set of batteries 550, a third set of batteries 560, and one or more optional solid state relays 590. Any of the first set, second set, or third set of batteries may be part of the same set of batteries and may be optional. Some embodiments may only include a single set of batteries.

The first set of batteries 510 may be used to power the homopolar generator 530 and may be charged by the electric vehicle components 520, such as by the alternator or a mechanical component (e.g., regenerative braking system, axle, drive shaft, etc.) of the electric vehicle. Operation of the homopolar generator 530 may be controlled by the controller 540. For example, the controller 540 may control a voltage output of the homopolar generator. In an embodiment, the controller 540 may cause the homopolar generator to output a voltage substantially equal to a charge level of a battery or an average charge level of a set of batteries, where the voltage increases over time. The voltage output may be based at least in part on a voltage of batteries being charged by the homopolar generator. The homopolar generator 530 may output current that can be used to charge the second set of batteries 550 and/or the third set of batteries 560. Current output from the homopolar generator 530 may be directed through the one or more solid state relays 590, which can be used to create parallel and/or series connections between the second set of batteries and the third set of batteries.

The homopolar generator 530 may be in a parallel connection with both the second set of batteries 550 and the third set of batteries 560, or may be in a series connection with the third set of batteries 560 through the second set of batteries 550. For example, the third set of batteries 560 may be in a parallel connection 570 with the homopolar generator 530, or a series connection 582. The connections may be dynamically switched by the one or more solid state relays 590.

Similarly, the second set of batteries 550 and the third set of batteries 560 may be dynamically switched from a parallel connection 580 to the electric vehicle 520 to a series connection 582 as needed during operation of the electric vehicle.

Figure 6:
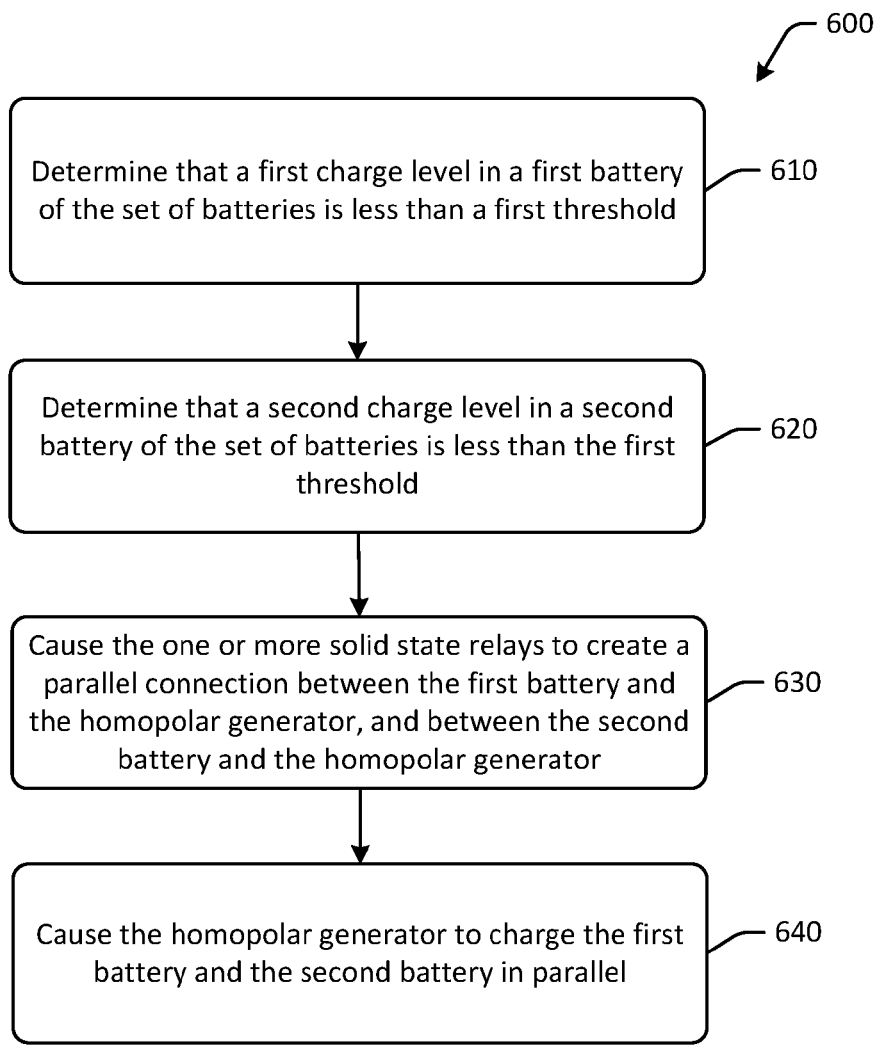
FIG. 6 is an example process flow diagram for control schemes and intelligent battery selection for electric vehicles having multiple rechargeable batteries in accordance with one or more embodiments of the disclosure.

FIG. 6 is an example process flow 600 for control schemes and intelligent battery selection for electric vehicles having multiple rechargeable batteries in accordance with one or more embodiments of the disclosure, and will be discussed in conjunction with FIG. 5.

At block 610 of the process flow 600, the controller 540 of FIG. 5 may determine that a first charge level in a first battery of the set of batteries is less than a first threshold. For example, the second set of batteries 550 may include a first battery and a second battery. The controller 540 may determine that a first charge level of the first battery is less than a threshold. The threshold may be an absolute value, such as a specific voltage, or may be a relative value or percentage value.

At block 620, the controller 540 may determine that a second charge level in a second battery of the set of batteries is less than the first threshold. For example, the controller 540 may determine that a second charge level of the second battery is less than the threshold. Both the first battery and the second battery in the second set of batteries 550 may therefore have charge levels that are less than the threshold.

At block 630, the controller 540 may cause the one or more solid state relays 590 to create a parallel connection between the first battery and the homopolar generator 530, and between the second battery and the homopolar generator 530. Accordingly, solid state relays may be used to manage electric connections for batteries within a set of batteries, in addition to electrical connections for sets of batteries.

At block 640, the controller 540 may cause the homopolar generator 530 to charge the first battery and the second battery in parallel. The batteries may therefore be charged in parallel and in a reduced length of time, relative to charging batteries in series.

Figure 7:
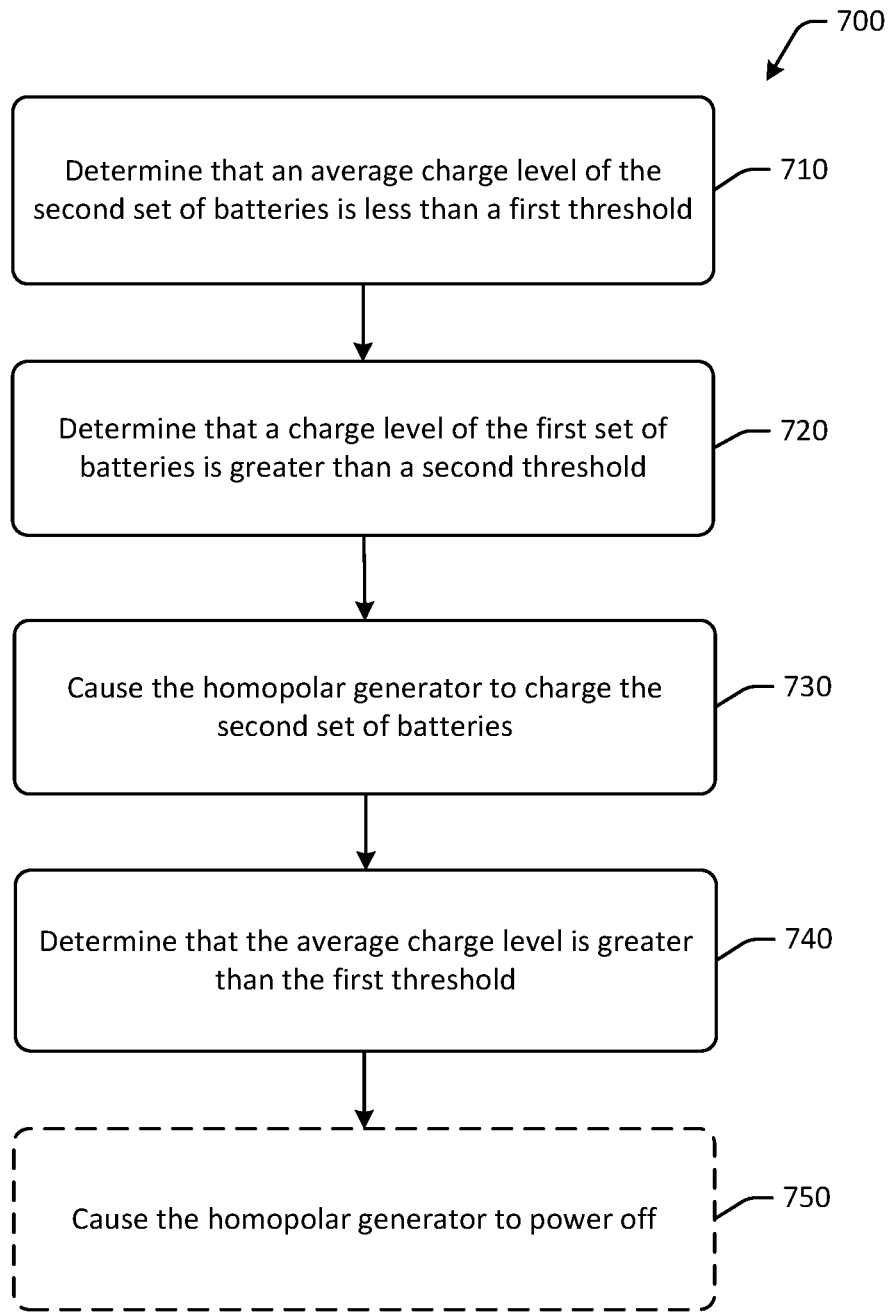
FIG. 7 is an example process flow diagram for control schemes and intelligent battery selection for electric vehicles having multiple rechargeable batteries in accordance with one or more embodiments of the disclosure.

FIG. 7 is an example process flow 700 for control schemes and intelligent battery selection for electric vehicles having multiple rechargeable batteries in accordance with one or more embodiments of the disclosure, and will be discussed in conjunction with FIGS. 5-6.

At block 710, the controller 540 may determine that an average charge level of the second set of batteries 550 is less than a first threshold. For example, the second set of batteries 550 may include multiple batteries, and the controller 540 may determine an average charge level of the batteries in the second set of batteries 550. The average charge level may be indicative of the total power capacity available from the second set of batteries 550.

At block 720, the controller 540 may determine that a charge level of the third set of batteries 560 is greater than a second threshold. For example, the second set of batteries 550 may have less than 25% charge, while the third set of batteries 560 may have greater than 75% charge.

At block 730, the controller 540 may cause the homopolar generator 530 to charge the second set of batteries 550. In some embodiments, the controller 540 may select specific batteries in the second set of batteries for charging and/or discharging. For example, batteries with charge levels greater than the average charge level of the second set of batteries 550 may be selected for discharging, while batteries with charge levels less than the average charge level of the second set of batteries 550 may be selected for charging.

At block 740, the controller 540 may determine that the average charge level is greater than the first threshold, and, at optional block 750, the controller 530 may cause the homopolar generator to power off. Accordingly, the second set of batteries 550 may be charged while the third set of batteries 560 is not charged.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms.

The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A method comprising:
    determining, by one or more computer processors coupled to at least one memory, a first charge level of a first battery system, wherein the first battery system is configured to power a homopolar generator;
    determining that the first charge level is less than a first threshold value;
    causing the first battery system to be charged by a power input source;
    determining that a second charge level of the first battery system is greater than the first threshold value;
    causing the first battery system to power the homopolar generator, wherein the homopolar generator is configured to output charging current to a second battery system, the second battery system comprising a first battery, a second battery, and a solid state relay;
    causing the solid state relay to form a parallel connection between the first battery, the second battery, and the homopolar generator;
    directing a first charging current from the homopolar generator to the first battery;
    directing a second charging current from the homopolar generator to the second battery, such that the second battery charges while the first battery is charging;
    determining that a third charge level of the first battery satisfies a second threshold;
    determining that a fourth charge level of the second battery satisfies the second threshold; and
    powering off the homopolar generator.

2. The method of claim 1, wherein the power input source is one or more components of an electric vehicle.

3. The method of claim 1, wherein the power input source is one or more solar panels.

4. The method of claim 1, wherein the first battery system and the homopolar generator are positioned in an electric vehicle comprising a third battery system, the method further comprising:
    determining a fifth charge level of the third battery system is less than the second threshold; and
    supplementing the third battery system with power from the second battery system.

5. The method of claim 4, further comprising:
    determining that a load of the electric vehicle is less than a third threshold; and
    causing a parallel connection to be created between the second battery system and the third battery system.

6. The method of claim 4, further comprising:
    determining that a load of the electric vehicle is greater than a third threshold; and
    causing a series connection to be created between the second battery system and the third battery system.

7. A charging system comprising:
    a homopolar generator;
    a set of batteries;
    one or more solid state relays configured to create series or parallel connections between individual batteries of the set of batteries; and
    a controller configured to:
        determine that a first charge level in a first battery of the set of batteries is less than a first threshold;
        determine that a second charge level in a second battery of the set of batteries is less than the first threshold;
        cause the one or more solid state relays to create a parallel connection between the first battery and the homopolar generator, and between the second battery and the homopolar generator; and cause the homopolar generator to charge the first battery and the second battery in parallel.

8. The charging system of claim 7, wherein the controller is further configured to:
   determine a load on the charging system; and
   cause either a series connection or a parallel connection to be created between the set of batteries and an external set of batteries based at least in part on the load.

9. The charging system of claim 7, wherein the charging system is enclosed in a housing and is portable.

10. The charging system of claim 7, wherein the charging system is powered by one or more components of an electric vehicle.

11. The charging system of claim 7, wherein the charging system is powered by one or more solar panels.

12. An electric vehicle comprising:
   a first set of batteries configured to be charged by operation of the electric vehicle;
   a homopolar generator configured to be powered by the first set of batteries;
   a second set of batteries configured to be charged by the homopolar generator;
   one or more solid state relays configured to create series or parallel connections between the second set of batteries and the homopolar generator;
   a third set of batteries configured to be in a series connection or a parallel connection with the second set of batteries; and
   a controller configured to:
      determine that an average charge level of the second set of batteries is less than a first threshold;
      determine that a charge level of the first set of batteries is greater than a second threshold;
      cause the homopolar generator to charge the second set of batteries;
      determine that the average charge level is greater than the first threshold; and
      cause the homopolar generator to power off.

13. The electric vehicle of claim 12, wherein the controller is further configured to:
   determine that a load on the third set of batteries is greater than a third threshold; and
   cause a series connection to be created between the second set of batteries and the third set of batteries.

14. The electric vehicle of claim 12, wherein the controller is further configured to:
   determine that a load on the third set of batteries is less than a third threshold; and
   cause a parallel connection to be created between the second set of batteries and the third set of batteries.

15. The electric vehicle of claim 12, wherein the controller is further configured to:
   cause a parallel connection to be created between the second set of batteries and the homopolar generator during charging using the one or more solid state relays.

16. The electric vehicle of claim 12, wherein the controller is further configured to:
   select specific batteries in the second set of batteries for charging and discharging.

17. The electric vehicle of claim 12, wherein the controller is further configured to:
   control a voltage output of the homopolar generator.

18. The electric vehicle of claim 12, wherein the controller is further configured to:
   receive real-time vehicle information from an onboard vehicle computer.

19. The electric vehicle of claim 12, wherein the controller is further configured to:
   cause the homopolar generator to output a voltage substantially equal to the average charge level, wherein the voltage increases over time.

20. The electric vehicle of claim 12, wherein the controller is further configured to:
   cause the homopolar generator to charge the second set of batteries in less than five minutes.

* * * * *